Oct. 26, 1965  C. H. SMOOT  3,214,660
CONTROL SYSTEM
Filed Nov. 7, 1960
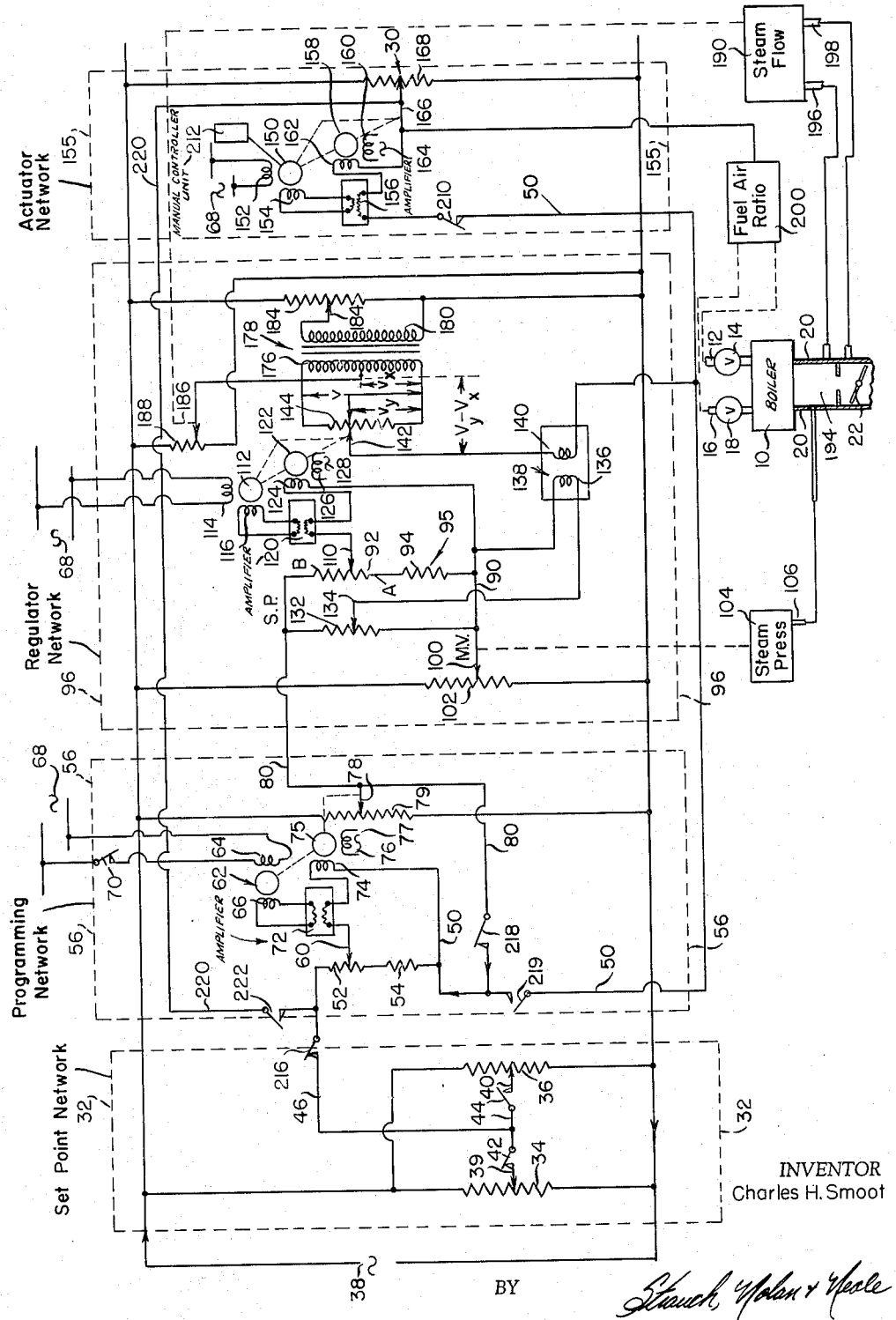
INVENTOR
Charles H. Smoot
BY
Strauch, Nolan & Neale
ATTORNEYS United States Patent Office 3,214,660
Patented Oct. 26, 1965

1

3,214,660
CONTROL SYSTEM
Charles H. Smoot, Deerfield, Ill., assignor to Rockwell Manufacturing Company, Pittsburgh, Pa., a corporation of Pennsylvania
Filed Nov. 7, 1960, Ser. No. 67,836
12 Claims. (Cl. 318—28)

The present invention relates to electrical control systems, and more particularly, to an electrical circuit for producing control forces responsive to changes in a condition which are utilized to return the condition to a desired set point.

In the regulation of variable process conditions, it has been customary, in recent years, to provide for electrical control systems which operate to automatically control the operation of a device, such as a valve or damper disposed in a process line, to thereby effectuate a desired condition in the process. Basically, such electrical control systems incorporate a control unit which is operable to regulate a process control device by automatically comparing an input signal representing the status of a measured variable control condition (such as fluid pressure, temperature or flow rate) with a pre-selected signal representing the value at which the measured process condition is desired to be maintained. The pre-selected electrical signal is commonly referred to as the "set point."

When the measured process condition deviates from the value of the process corresponding to the set point, the input signal, representing the measured process condition, is correspondingly changed and the control unit of the system is operable to produce an error signal representing the difference between the set point and the input signal. The error signal is impressed in the control unit in the electrical circuit to provide for an output signal from the electrical circuit which supervises the operation of the process control device. In accordance with the value of the circuit output signal, the process control device is conditioned to restore the input signal to a value that is equivalent to the set point. In the case of a valve, the position of a valve will be conditioned in accord with the value of the output signal of the circuit to return the measured variable process condition to a value where the input signal corresponds to the set point signal.

In establishing the electrical circuit output signal for conditioning the valve or other process control device, several basic types of control actions have been proposed.

In one type of control action, referred to as "proportional position," the control circuit output signal for controlling the position of the process condition-controlling device has a different and definite value for each value of the error signal so that the electrical circuit output signal is dependent only on the amount of deviation of the measured variable from the set point. Thus, with the "proportional position" control action, there is a continuous linear relation between the value of the control variable and the position of a final control element.

In another type of control action, known as the "proportional speed floating" or "reset" control, the control circuit output signal is proportional to the time integral of the error signal. In this type of control action, the time rate of change of the output signal is proportional to the value of the error signal and consequently, the value of the output signal will be proportional to the time integral of the error signal. Thus, the value of the electrical

2 circuit output, and consequently the valve position, does not depend on the value of the error, but rather the integral of the instantaneous value of the error over the time during which the error exists. It will be appreciated that with this proportional speed control action, there is a continuous linear relation between the value of the controlled variable and the rate of motion of the valve.

In another type of control action referred to as a "derivative" or "rate' control, the control action is proportional to the rate of acceleration of the change of the variable process condition and is utilized to increase the speed of operation to give a faster response to any transient deviation from the set point.

In the automatic control art, it will be appreciated that frequently either a "rate" control action or a "reset" control action may be used alone with a "proportional position" mode of control, or both "rate" and "reset" control actions may be used together with the "proportional position" control action to effectuate a desired operation of the process valve or other process control device.

In control circuits of the type referred to, a primary controller signal impressed on the circuit is modified or modulated by various selected combinations of the foregoing control actions in the control unit of the circuit. The modified or modulated signal is then applied to a repeater or actuator unit having an output actuator, such as a motor-operated potentiometer wiper. The actuator is conditioned by the modified controller signal to produce the output signal. The output signal on the actuator is transmitted to a device which converts the output signal from an electrical impulse to a regulatory force for use in positioning the process valve or other process-control device.

Normally, the actuator is continuously automatically controlled by the modified controller signal to automatically condition the process valve. Sometimes, during operation of various processes, it is desirable to interrupt the automatic circuit control of the actuator and to utilize a separate control source which is independent of the circuit to control the actuator to thereby position the process valve independently of the control circuit. Such separate control sources may be a manual or programmed digital control which are connected to condition the actuator independently of the automatic control circuit modulated input signal. Under the supervision of such separate control sources, the actuator is conditioned to provide a selected output signal which will thereby facilitate selective positioning of the process valve. Under the foregoing conditions providing independent selective control of the actuator, the output signal usually is varied to some magnitude which differs from the output signal that the modified controller signal of the automatic control circuit would otherwise produce.

It will be appreciated that by manual operation of the circuit actuator and, consequently of the process valve or other process-control device, the position of the process valve is usually varied to establish a process condition which produces a control circuit input signal having a value that is different from the set point. Since the control circuit modulated signal produced as a result of the error between the set point and input signals is not regulating the actuator under manual operating conditions, the position of the actuator does not correspond to the value of the modified controller signal.

Therefore, it will be appreciated that if the automatic control circuit is restored to control the operation of the actuator at a time when the measured process condition is at some value so as to impress an input signal on to the automatic control circuit which is not equal to the set point signal, the modified controller signal will rapidly bring the actuator back to a position for balancing the circuit. As a consequence of such rapid movement of the actuator, the output signal supplied by the actuator will be rapidly changed and there will be a corresponding sudden change in the position of the process valve or other device under the control of the output signal.

Such a sudden change in the process valve or other process device often has the effect of upsetting the entire process so that substantial time-consuming efforts are required before a smooth and desirable control condition in the process is re-established.

Some previously proposed systems of automatic control for transferring from manual to automatic operation without appreciable disturbance of the process under control require complicated manipulation of various controller elements in order to avoid disturbances tending to upset the process under control. Such manipulations require the operator of the process to have special training so that he can understand the effects of each adjustment upon the system.

If the control circuit incorporates "proportional position" action or "proportional position" action combined with "derivative" (rate) control action, the deviation between the input signal and the set point signal when restoring automatic control thus requires compensation by manual adjustment and balancing before the transfer from manual or computer control to automatic control is made in order to obviate a sudden change in the position of the condition-controlling process device.

When the control circuit incorporates a "reset" control action, additional difficulties develop in that such a control action impresses a signal in the circuit control unit which is a function of time and magnitude of the deviation from the set point signal, and consequently is not readily compensated for upon re-transfer to automatic control, especially if there has been a sustained or appreciable time deviation from the set point.

The present invention contemplates and has as its primary purpose a simplified control system which in varying combinations, may provide proportional, reset and rate control actions for the automatic operation of a process-control device wherein the control system is operable to be disconnected from its set point source and from its output actuator to permit manual operation of the output actuator and wherein a connection is provided for during manual operation of the output actuator to feed the manually produced voltage on the actuator into the system in place of the set point source. The manually produced voltage related back to the circuit is compared with a controller signal in the circuit which normally regulates the actuator during automatic operation to facilitate a control action which automatically adjusts the control system in accord with the manually adjusted position of the output actuator so that the system will be properly balanced with respect to the manually adjusted position of the output actuator when automatic control is restored.

In other words, during manual operation of the output actuator, the variable manually produced output signal voltage at the actuator replaces the original set point signal voltage in the circuit and is compared with the circuit controller signal voltage which, under automatic control, normally regulates the circuit output signal voltage at the actuator so as to develop a signal which acts through control actions to make the controller signal voltage balance with the manually produced output signal voltage. Under these conditions, when the manual control is disconnected from the actuator and the automatic control circuit is restored, there is no sudden change in the position of the actuator since the magnitude of the controller signal voltage is balanced with the actuator output voltage at the time that the atuomatic circuit is restored.

It is accordingly the primary object of the present invention to provide for a novel control circuit in which automatic operation is restorable from manual operation without any perceptible change in the output signal of the control circuit or any change in the position of the condition-varying process control device.

A more specific object of the present invention is to provide for a novel control circuit wherein the circuit is readily adapted for switching from manual operation to automatic operation by automatically and continually adjusting the control system in accord with the manually adjusted position of the output element so that the system will be properly balanced with respect to the manually adjusted position of the output element when the automatic control is restored, thereby eliminating the necessity of manually rebalancing the system when the transfer from manual to automatic control is made.

A further specific object of the present invention is to provide for a novel control circuit having an output signal actuator adapted for alternate manual or automatic control and a controller unit which automatically controls a circuit output signal on the actuator by comprising a measured variable signal with a set point reference to produce, under the controller unit control action, a signal which modulates a controlling input signal supervising the actuator output signal wherein the output signal during manual control is disassociated from the controlling signal of the unit and related back to be impressed on the controller unit in place of the set point reference for comparison with the modulated controlling signal to produce a signal which is operative under the control action of the unit to act on the modulated controlling signal such that any deviation between the modulated controlling signal and the manually produced output signal is reduced to zero.

Another object of the present invention is to provide for a novel control circuit according to the preceding object wherein the measured variable signal corresponds to a measured variable process condition which is regulated by the circuit output signal.

Still another object of the present invention is to provide for a novel control circuit according to the preceding object wherein the input signal corresponds to an additional variable process condition.

A further object of the present invention is to provide a novel control circuit according to the preceding object wherein the additional variable process condition is controlled by a source independent of the circuit and wherein the circuit output signal is operative to control other variable process conditions.

Another object of the present invention is to provide for a novel control circuit according to the preceding object wherein the control action of the controller unit is a reset control action.

Still another object of the present invention is to provide for a novel control circuit according to the preceding object wherein the control action of the controller unit is additionally a proportional action.

A further object of the present invention is to provide for a novel control circuit which is utilized to automatically maintain a measured variable process condition at a constant value corresponding to a fixed set point reference input signal by means of an output signal arranged for alternate manual or automatic control of the process condition wherein a value of the process condition arrived at during a manual control of the output signal can be utilized as the set point input signal in the circuit alternatively with respect to the fixed set point reference when automatic control is restored.

Further objects of the present invention will appear as the description proceeds in connection with the appended claims and the annexed drawing wherein:

The single figure of the drawing is a circuit diagram of a control system embodying the invention.

Referring now to the drawing, the preferred embodiment of the present invention is shown to be applied in a system for controlling the rate of combustion of a steam boiler 10 to maintain substantially constant steam pressure.

Fuel is supplied to boiler 10 through a pipeline 12 containing a valve 14 for controlling the flow of fuel through the pipeline. Air is supplied by conventional forced or induced draft fans (not shown) to the boiler through a pipeline 16 containing a control valve 18. Steam from the boiler 10 is discharged through a header 20 to any desired load such as turbine (not shown) or the like under control of a valve 22 disposed in header 20.

According to the present invention, the fuel and air supply are controlled in response to the steam flow rate and pressure in header 20 by means of a balanceable electrical control system 30 of the electrical type which is operative to control the positions of valves 18 and 14 in response to the magnitudes of steam flow rate and steam outlet pressure.

As shown, circuit 30 is adapted to provide for a proportional position control action plus a reset or proportional speed floating control action which are operative to regulate the output signal voltage of circuit 30 for controlling valves 14 and 18.

Circuit 30, as shown, comprises a set point network 32 having a pair of resistors 34 and 36 connected in parallel across an alternating current source 38. Manually adjustable along resistors 34 and 36, respectively, are a pair of wipers 39 and 40 which are connected in parallel through switches 42 and 44 to a conductor 46. By selective actuation of switches 42 and 44, wipers 39 and 40 are independently and alternately operable to each impress and adjustable set point signal voltage in conductor 46. Wiper 39 normaly is adjusted to provide for a set point signal voltage having a magnitude which is representative of the most desirable process conditions to be maintained. During operation, switch 44 is normally opened and switch 42 is normally closed to thereby respectively disconnect wiper 40 from the circuit and to connect wiper 39 to the circuit.

When it is desired to impress a set point signal of a different magnitude upon the circuit, wiper 40 is adjusted to the desired value and switches 42 and 44 are respectively opened and closed.

By means of this circuitry, it will be appreciated that it is not required to disturb the setting of wiper 39 when it is desired to change the magnitude of the set point signal.

The set point signal voltage produced in either wipers 39 or 40 is transmitted through line 46 which is connected to a line 50 across a potentiometer resistor 52 and a fixed resistor 54 which are connected in series in a programming network generally indicated at 56. Resistor 52 is provided with a wiper 60 manually movable therealong and the voltage appearing at wiper 60 is utilized to control a reversible motor 62. Motor 62 is a conventional two phase reversible type motor and has a main power winding 64 and a control winding 66. Winding 64 is connected across an alternating current source 68 in series with a switch 70. Control winding 66 is supplied with current from the output side of an amplifier 72 having one of its input terminals connected to wiper 60. The other input terminal of amplifier 72 is connected through a field winding 74 of a generator 75 to line 50. Generator 75 is provided with a feed winding 76 connected across a suitable current source 77 and has its armature mechanically connected to motor 62.

Motor 62 is mechanically connected to an adjustable wiper 78 such that operation of motor 62 adjusts wiper 78 along a potentiometer resistor 79 which is connected across source 38. Wiper 78 is connected to line 50 through a line 80 so that the voltage difference between either of the set point wipers 38 or 40 and wiper 78 is impressed across resistors 52 and 54.

With the circuitry thus far described, the set point and programming networks 32 and 56, respectively, are in balance when the voltage at wiper 78 is equal to the voltage at either of the set point wipers 39 or 40, whichever set point has been selected. Under these conditions, the voltage at wiper 60 is zero so that there is no input to amplifier 72 to energize control winding 66. At this time, motor 62 is stationary and wiper 78 is adjusted to a proper position.

Assuming now that there is an adjustment of either wipers 39 or 40 or a change over is made from wiper 39 to 40 to provide to change the voltage at line 46, the circuit connecting resistor 52 to resistor 79 will be unbalanced to create a voltage at wiper 60 which is supplied to the input side of amplifier 72 and which has an amplitude and phase proportional to the amount and direction of unbalance from the new set point. Amplifier 72 then supplies a control current to motor control winding 66 which will cause motor 62 to turn in a direction determined by the direction of change in the set point and at a speed proportional to the amount of the unbalance.

As motor 62 turns, it adjusts wiper 78 to increase or decrease the output voltage thereon. This changed output voltage is fed back through lines 80 and 50 such that the voltage difference between line 46 and line 50 is continually impressed across resistors 52 and 54 and depending upon the adjusted position of wiper 60, a predetermined portion of that voltage difference is applied to wiper 60 for operating motor 62 to adjust wiper 78 to a position where the voltage at wiper 78 again equals the set point signal voltage at line 46.

Wiper 60 may be adjusted to any desired position on resistor 52 to set the maximum speed of motor 62 and limit the rate of adjustment of the output voltage at wiper 78. Since resistor 54 has a fixed value, adjustment accomplished by movement of wiper 60 can never be run to zero.

By operation of motor 62, generator 75 is turned to generate in winding 74 an alternating voltage which is out of phase to the voltage at wiper 60 to thereby oppose the voltage at wiper 60. The signal voltage generated in winding 74 is proportional in magnitude to the speed of rotation of motor 62, and is representative of the rate of change appearing at wiper 78. The signal voltage generated in winding 74 is added to the voltage at wiper 78 such that the amplifier 72 senses the difference between the voltage signal at wiper 60 and the voltage signal at wiper 78 minus the rate at which the difference between these voltage signals is being reduced. This type of negative feed-back prevents wiper 78 from over-shooting or hunting a balanced position. The mathematical relationship between the generator and wiper voltages may be expressed as follows:

$$K_1 \Delta V_w = \frac{dV_1}{dt}; \text{ or } V_1 = K_1 \int \Delta V_w dt$$

where $V_1$ is the output voltage at wiper 78, $\Delta V_w$ is the voltage difference across lines 50 and 46, $K_1$ is a proportionality constant set by the adjustment of wiper 60 and $t$ is the time over which the voltage difference is acting.

Thus, by feed-back of the programming network, the signal voltage at wiper 78 provides a continuous check to assure that the set point signal voltage transmitted through programming network 56 is continually stabilized. The programming network has an additional function in the circuit as will hereinafter become apparent.

With continued reference to the drawing, the set point voltage signal is transmitted through line 80 which is connected to a line 90 across a potentiometer resistor 92 and a fixed resistor 94 which are arranged in series in a controller or regulator network 96. Network 96 has a proportional plus reset control action, as will become apparent.

Line 90 is connected to a wiper 100 which is adjustably movable along a resistor 102 connected across source 38. Wiper 100 is moved along resistor 102 in response to variations in steam pressure by means of a regulator unit 104 which is connected to steam header 20 as by a conduit 106. Regulator units of this type are of conventional construction as shown in my United States Letters Patent 2,743,869, issued May 1, 1956.

By means of this circuitry it will be appreciated that the signal voltage at line 90 represents the measured variable which in this case is the measured steam pressure. The voltage across the lines 80 and 90, and consequently across resistors 92 and 94, therefore represents the error signal voltage which is the difference between the set point signal voltage at line 80 and the measured variable signal voltage at line 90. Resistors 92 and 94 form a reset adjustment circuit 95 as will become apparent.

Resistor 92 has a wiper 110 which is adjustably movable therealong. Since resistor 94 has a fixed value, the adjustment of wiper 110 on resistor 92 can never run to zero.

The voltage at wiper 110 is utilized to control a reversible motor 112 of the conventional two phase type having a main power winding 114 and a control winding 116. Winding 114 is energized from source 68 and winding 116 is supplied with current from the output of an amplifier 120. The current supplied by amplifier 120 may lag or lead the current in main winding 114 so as to turn the motor 112 in one direction or the other as is well understood in the art. Motor 112 is mechanically connected to the armature of a generator 122 having a pair of field windings 124 and 126. Winding 126 is energized from a standard source of alternating current supply 128. One of the input terminals of amplifier 120 is connected to wiper 110 and the other input terminal of amplifier 120 is connected through winding 124 to line 90.

With continued reference to the drawing, a proportional band potentiometer resistor 132 is connected across lines 80 and 90 such that the voltage difference between the set point signal voltage at line 80 and the measured variable signal voltage at line 90 is impressed across resistor 132. A wiper 134 is adjustably movable along resistor 132 and is connected through an input winding 136 of an amplifier 138 to line 90. Amplifier 138 is provided with an output winding 140 having one terminal connected to a wiper 142 and its other terminal connected to line 50.

Motor 112 is mechanically connected to wiper 142 which is movable over a potentiometer resistor 144 such that operation of motor 112 controls the adjustment of wiper 142.

The voltage at wiper 142 is utilized to drive a standard two phase reversible motor 150 having a rotor energized by a main field winding 152 and a control winding 154 in a final output actuator network generally indicated at 155. Winding 152 is energized from source 68 and winding 154 is connected to the output side of an amplifier 156. Amplifier 156 is operative to supply winding 154 with alternating current which leads or lags the current in the main winding 152 so that motor 150 will turn in one direction or the other as is well understood in the art. Motor 150 is mechanically connected to a generator 158 having a pair of field windings 160 and 162. Winding 160 is connected across a suitable alternating current source 164.

One input terminal of amplifier 156 is connected through generator winding 162 to an output control wiper 166 which is movable over a potentiometer resistor 168 connected across source 38. Wiper 142 is connected to the other input terminal of amplifier 156 through amplifier output winding 140 and line 50. Motor 150 is mechanically connected to wiper 166 to thereby control the movement of wiper 166 along the resistor 168.

With continued reference to the drawing, potentiometer resistor 144 is connected directly across a secondary winding 176 of a transformer 178. Transformer 178 includes a primary winding 180 supplied with voltage from a wiper 182 which is movable over a potentiometer resistor 184 connected across source 38. Connected to the mid-point of secondary winding 176 is a wiper 186 which is movable along a potentiometer resistor 188. Resistor 188 is connected across source 38 and the position of wiper 186 on resistor 188 is controlled by a transmitter device 190. The transmitter device 190 is operable to produce a regulated controlling force for positioning the wiper 186 such that the voltage in wiper 186 will be proportional to the steam flow through steam header 20.

Transmitter device 190 may be of any conventional type such as that disclosed in Patent No. 2,743,869. In order to measure the flow of steam through steam header 20, an orifice restriction 194 is provided in steam header 20 between boiler 10 and valve 22. Conduits 196 and 198 are provided on each side of orifice restriction 194 to transmit to a sensing element in transmitter device 190 the pressure drop across orifice restriction 194.

With the system thus far described, changes in the steam load demand on boiler 10 cause corresponding variations in the steam flow rate through header 20. The regulating force produced by transmitter 190 is varied in proportion to the steam flow rate variations to thereby continuously represent the instantaneous flow rate and to position wiper 186 along resistor 188 such that the voltage at wiper 186 is proportional to the steam flow rate. The voltage at wiper 186 is transmitted as a primary signal voltage to secondary transformer winding 176, entering at the center tap of winding 176 and leaving through wiper 142. When the steam pressure is such that regulator 104 produces a measured variable signal voltage at wiper 100 equal to that of the set point signal voltage in line 80, motor 112 remains stationary and wiper 142 is positioned by motor 112 at the center of resistor 144 as will be explained. Also, when the set point signal voltage at line 80 is equal to the measured variable signal voltage at line 90, there is no voltage applied to amplifier input winding 136, and consequently, zero voltage is established in the amplifier output winding 140 by the input.

Under the foregoing conditions the primary signal voltage at wiper 186 is transmitted without modulation to the input side of amplifier 156 and when the voltage at wiper 186 is equal to the voltage at wiper 166, motor 150 will remain stationary. Under this condition, the output signal voltage at wiper 166 is constant and is transmitted to a conventional fuel-air ratio regulatory device 200 which is mechanically connected to valves 14 and 18 and which is operable to convert the output signal voltage from wiper 166 into a regulatory force for positioning valves 14 and 18 in accord with condition requirements. Thus, when the output signal voltage is constant, valves 14 and 18 will be held in an adjusted position.

When the primary voltage transmitted by wiper 186 is varied by movement of wiper 186 in response to a change in steam flow rate, amplifier 156 will supply voltage of one phase or another to motor control winding 154. Energization of control winding 154 by current supplied from amplifier 156 will cause motor 150 to turn in a predetermined direction to adjust wiper 166 thereby increasing or decreasing output signal voltage. The changed output voltage acts through device 200 to alter the position of valves 14 and 18. It will be appreciated that this operation is effected very rapidly to assure rapid adjustment of the air supply to boiler 10 to correspond with the instantaneous rate of steam flow through header 20. Thus, it will be appreciated that the magnitude of the primary signal voltage produced at wiper 186 is linear with the steam flow rate and controls the operation of valves 14 and 18 to thereby reflect and adjust for changes in load demand.

As motor 150 turns, it will also turn generator 158 such that a voltage is generated in winding 162 which is out of phase with and opposes the voltage transmitted from wiper 186 to the input side of amplifier 156. As described with respect to the operation of generator 75, the generator voltage tends to balance the input signal voltage and is representative of the rate of change of the output signal voltage at wiper 166. This action prevents wiper from over-shooting or hunting its properly adjusted position as hereinbefore explained. When wiper 166 reaches an adjusted position such that the primary incoming voltage to the input side of amplifier 156 is balanced, then the voltage across amplifier 156 is reduced to zero. As a consequence, current ceases to be applied to motor winding 154, and the operation of motor 150 to be interrupted.

Since the positioning of fuel 14 in response to variation of steam flow rate may not always accurately set the fuel flow rate to an optimum magnitude for a given load demand, the slightly greater or lesser full rates which are attained, cause the steam pressure to rise or fall below the desired control point established by the set point network 32.

In order to condition the fuel valve 14 for bringing the steam pressure back to its desired set point, it will now be seen that the primary input signal voltage which is transmitted through wiper 186 and which represents the steam flow rate, is modified or modulated by the proportional plus reset control action in controller network 96 to restore the steam pressure to the set point value.

The proportional control action occurs when there is a deviation of the steam pressure signal voltage, $E_{mv}$, at wiper 100 or at line 90 from the set point signal voltage at wiper 78 or at line 80 such that a finite voltage is impressed across lines 80 and 90 which represents an error signal voltage $E_e$. The error signal voltage is algebraically expressed as follows:

$$E_e = E_{sp} - E_{mv}$$

By selectively positioning wiper 134 on resistor 132, a predetermined portion of the error signal voltage is measured and is applied to the amplifier input side 136 so as to produce a corresponding signal voltage in the amplified output side 140. The amplifier output side 140 is arranged to add or substract its voltage impressed by the amplifier input 136 to or from the input signal voltage in wiper 142 to thereby modulate the input signal voltage. The modulated input signal voltage is applied to the input side of amplifier 156 and will be proportional to the change in the measured steam pressure. As a consequence, the output signal voltage at wiper 166 will be changed by operation of motor 150 in an amount necessary to balance the change produced by the amplifier output 140. It will be appreciated that this change can be produced only by movement of wiper 166 in proportion to the change in the measured variable from the set point.

Selective adjustment of the proportional bank wiper 134 is effective to vary the portion of the error signal voltage, $E_e$, applied to the input side 136 of amplifier 138.

The reset control action is operative to move wiper 142 away from the mid-point on resistor 144 such that the primary input voltage transmitted by wiper 186 is modulated by an addition or subtraction voltage as will presently become more apparent. In effectuate the reset control action, the total voltage difference across lines 80 or 90 or error signal voltage, $E_e$, is applied across the reset adjustment 95, which, as hereinbefore described, consists essentially of fixed resistor 94 and potentiometer resistor 92. The position of the wiper 110 on resistor 92 determines the portion of the total error signal voltage to be applied to amplifier 120. When wiper 110 is positioned at point B, the total error signal voltage is measured and applied to amplifier 120 so as to effectuate a maximum reset rate. When wiper 110 is positioned at point A, there will be zero reset rate applied in the circuit since no voltage is applied across amplifier 120 to run motor for positioning wiper 142.

Assuming now that wiper 110 is positioned on resistor 92 at some location intermediate points A and B, when a change in the measured variable signal voltage, $E_{mv}$, from the set point signal voltage, $E_{sp}$, occurs, the proportional control action takes place as hereinbefore described. At the same time, a measured portion of the voltage difference or error signal voltage, $E_e$, is applied to the input side of amplifier 120, the magnitude of which is determined by the setting of wiper 110.

Amplifier 120 senses the magnitude and direction of the voltage applied through its input and, in response thereto, supplies current to motor control winding 116 to cause motor 112 to turn on a predetermined direction for restoring a zero voltage difference or zero error signal voltage by bringing the measured variable signal voltage back to the set point signal voltage. During the period of unbalance between the measured variable signal voltage and the set point signal voltage, motor 112 will respond at a speed which is proportional to the magnitude of the system unbalance which is represented by the change in measured variable signal voltage.

Since generator 122 is mechanically connected to motor 112, operation of motor 112 is effective to produce a voltage in generator winding 124 as hereinbefore described with respect to generator 75. This output voltage from generator winding 124 is applied to the input side of amplifier 120 to oppose the amplified input voltage which may be expressed as:

$$K_1 E_e$$

where $K_1$, is a constant factor determined by the position of wiper 110 on resistor 92.

The generator output voltage from winding 124 reduces the amplifier input voltage, $K_1 E_e$, by an amount proportional to the speed of generator 122 and, consequently, to the speed of motor 112. Thus, as the circuit approaches a balanced condition where the measured variable signal voltage again becomes equal to the set point signal voltage, it will be appreciated that the reduction in error signal voltage, $E_e$, causes the movement of motor 112 and, consequently, wiper 142 to slow down. As a result, the generator output voltage becomes correspondingly less as the set point is approached so that wiper 142 comes to rest precisely at the point on resistor 142 necessary to effectuate re-balance of the circuit without over shooting or cycling back and forth. Thus, the tendency of wiper 142 to hunt or cycle about the balance point is obviated.

Operation of motor 112 moves wiper 142 away from the mid-point on resistor 142. It will be appreciated that when the voltage across the transformer secondary 176 and across resistor 144 is a magnitude V, then the voltage, $V_x$, at the transformerg secondary center point is constant at ½V. When wiper 142 is positioned at the mid-point of resistor 144 by motor 112 the voltage, $V_y$, at wiper 142 is also equal to ½V. As a consequence, $V_y - V_x = 0$ and no reset modulation of the primary signal voltage occurs.

When an error signal voltage, $E_e$, is produced and applied to amplifier 120, motor is run in a predetermined direction to move wiper 142 away from the mid-point on resistor 144 to apply a reset control action as hereinbefore explained. Under the foregoing conditions, when wiper 142 is above the mid-point on resistor 144, then $V_y$ is greater than $V_x$. Thus, the difference between $V_y$ and $V_x$ becomes a positive quantity which adds to the primary input signal voltage so as to thereby raise the primary input signal voltage under the control of the reset action. When motor 112 is operative to move wiper 142 below the mid-point of resistor 144, $V_y$ becomes smaller than $V_x$ and $V_y - V_x$, therefore becomes a negative quantity that lowers the primary input signal voltage when added to it.

From the foregoing, it will now be appreciated that the primary input signal voltage from wiper 186 is modulated initially by the addition or subtraction voltage produced in the amplifier output 140 and additionally by the addition or subtraction voltage produced by movement of wiper 142 away from the mid-point on resistor 144 before it is retransmitted to amplifier 156. As a consequence, the output signal voltage at wiper 166 is correspondingly varied to modify the regulatory force produced by the fuel-air ratio device 200.

Thus, assuming a change in the load demand on boiler 10, and a consequent variation in the steam flow rate, the primary input signal voltage is transmitted through wiper 186 and is applied to amplifier 156 to produce an initial change in output signal voltage which will adjust the positions of valves 14 and 18 as hereinbefore explained. When the fuel flow rate is not accurately set by the initial output signal voltage, the steam pressure will rise above or fall below the desired set point value. When this occurs, regulator 104 is operative to adjust the position of wiper 100 and to thereby produce a voltage difference across lines 80 and 90 which is represented by the error signal voltage, $E_e$, as hereinbefore explained.

Thus, a voltage will be applied to the input of amplifier 138 thereby producing a voltage in the amplifier output winding 140.

Assuming that an increased voltage output of wiper 142 or wiper 166 represents an increase in the steam flow rate the voltage on the output winding 140 of amplifier 138 subtracts from the voltage at wiper 142 with an increase in steam pressure and adds to the voltage at wiper 142 with a decrease in steam pressure.

Thus, the initial correction of the primary signal voltage is provided for by the proportional control action.

When the error signal voltage is impressed to run motor 112 and adjust the position of wiper 142, as hereinbefore described, a further addition or subtraction voltage is applied to modulate the input signal voltage. The change in the output signal voltage resulting from the proportional plus reset control action modifies the regulatory output force of device 200 to adjust fuel valve 14 to thereby bring the steam pressure back to its desired set point.

With the system thus far described, the circuit output signal voltage at wiper 166 is continuously automatically controlled by the controller network 96. Sometimes, however, it is desirable to manually control the output signal voltage. Manual control may conventionally be accomplished by disconnecting the modulated input signal voltage with a switch 210 disposed in line 50 between the input of amplifier 156 and the connection of the amplifier output side 140 to line 50.

When switch 210 is opened, motor 150 may be selectively turned in either direction by means of a conventional manual controller unit 212 such as that shown in the April 1951 publication of "Power" in the article entitled "Electronics for the Power Engineer, 36—Automatic Combustion Control" on pages 99–102 and 214, and more specifically under the sub-heading of this article entitled "Manual Control." Alternatively, it will be appreciated that motor 150 may be independently controlled by a digital programming computer.

By manual operation of motor 150, wiper 166 may be selectively positioned on resistor 168 to produce a desired output signal voltage which is fed into device 200 for controlling valves 14 and 18 as hereinbefore described.

The difficulty experienced with the foregoing manual operaion is that when steam pressure is varied from the set point established by set point network 32, regulator 104 is operative to adjust wiper 100 to produce an error signal voltage across lines 80 and 90.

The error signal voltage is operative as hereinbefore described to initiate the proportional and reset control actions of controller network 96. When this condition occurs, the primary input voltage transmitted by wiper 186 is modulated as hereinbefore described, and the resulting modified input signal voltage is applied to line 50 which calls for an adjustment of wiper 166 from its manually adjusted position. Thus, when the manual controller unit 212 is disconnected and switch 210 is closed to restore automatic control of wiper 166, this modified input signal voltage is applied to amplifier 156 which operates motor 150 to adjust wiper 166 to a position where the circuit is balanced. As a consequence, there is a sudden movement of wiper 166 from its manually controlled position to the automatic position corresponding to the modified input signal voltage when system 30 is restored to operation.

It will be appreciated that by sudden displacement of wiper 166 along resistor 168, the output signal voltage controlling device 200 is suddenly changed by a corresponding magnitude. As a result, the regulatory force produced by device 200 is operative to re-position valves 14 and 18 with a sudden movement, which action often upsets the entire equilibrium of boiler 10. As a consequence in transferring from manual to automatic operation it heretofore has been required to manually rebalance the system 30 such that the direction of system 30 is again brought into balance with the operation that had been directed by the manual operation of the boiler.

The present invention eliminates the foregoing difficulty experienced when switching from manual to automatic operation by providing for a special switching system which obviates the necessity of manually rebalancing system 30 upon re-transfer from manual to automatic operation and which comprises a switch 216 disposed in line 46, a switch 218 disposed in line 80 between wiper 78 and the connection with line 50, and a switch 219 in line 50 between the connection with line 80 and the connection with amplifier output 140. A line 220 containing a switch 222 also is provided for and is connected at one end to wiper 166 and at the other end to line 46 between switch 216 and resistor 52.

During automatic operation, switches 70, 210, 218 and 216 are closed and switches 219 and 222 are opened. In order to accomplish a transfer from automatic control of wiper 166 to manual operation thereof, switches 210, 216 and 218 are opened and switches 219 and 222 are closed.

By opening switch 216, the entire set point network 32 is disconnected and isolated from system 30. By opening switch 210, the transmittal of the modified input signal voltage to amplifier 156 is interrupted and actuator network 155 is disconnected from system 30. By opening switch 218, the set point feedback signal voltage at line 80 is interrupted.

By closing switch 222 the manually produced output signal voltage, which is now under the supervision of manual controller 212, replaces the disconnected original set point signal voltage in system 30. By closing switch 219 the modified input signal voltage replaces the set point signal feedback voltage in system 30.

Thus, it will be appreciated that under manual operating conditions, the voltage impressed across resistors 52 and 54 is the difference between the manually produced output voltage, $V_{mo}$, at wiper 166 and the modulated input voltage, $V_{mi}$, transmitted from wiper 186 through the amplifier output 140. Consequently, the voltage at wiper 60 will be the algebraic difference between $V_{mo}$, and $V_{mi}$ times a constant K which is determined by the adjustment of wiper 60.

As hereinbefore described, the voltage at wiper 60 is utilized to control motor 62 to develop an output voltage, $V_o$, at wiper 78. Motor 62 thereby effectuates a continuous adjustment of wiper 78 to a position representative of the condition of valves 14 and 18 as effected by the manual control thereof through controller unit 212.

From the foregoing description of networks 56 and 96 it can now be appreciated that the output voltage, $V_o$, at wiper 78 may be mathematically expressed as follows:

$$V_o = K \int (V_{mo} - V_{mi}) dt$$

Thus, the difference between the output voltage, $V_o$, at wiper 78 or at line 80 and the measured steam pressure signal voltage, $V_{mv}$, is impressed across proportional band resistor 132 and also across the reset adjustment 95 to provide for a new error signal voltage ($V_o - V_{mv}$) which develops the proportional and reset control actions in network 96 in the same way as hereinbefore explained. Thus, the proportional and reset control actions developed by the voltage difference $V_o - V_{mv}$ corrects the primary input signal voltage transmitted by wiper 186 to modulate this primary input signal voltage and thereby bring it back to equal the manually produced output signal voltage, $V_{mo}$, which is acting as a set point signal in system 30. As a result, the primary input signal voltage transmitted by wiper 186 is modulated by the foregoing control action such that when it is applied to the input of amplifier 156 again, it will balance with the manually produced output signal voltage at wiper 166 and therefore will not operate motor 150 to adjust wiper 166 to a new position.

Consequently, where it is desired to automatically sustain the condition of steam pressure arrived at through manual control of valves 14 and 18, it is not necessary to manually rebalance system 30 upon transfer from manual to automatic control. Thus, assume that switches 70, 210, 216, 218, 219 and 222 are set for manual operation and wiper 166 is under the manual control of controller unit 212 to facilitate a selective positioning of valves 14 and 18. When it is desired to automatically sustain the steam pressure condition at boiler 10 which have arrived at through manual operation, switches 70, 219 and 222 are opened and switches 210, 216 and 218 are closed. By opening switches 70, motor winding 64 is de-energized and motor 62 is rendered stationary and inoperative to adjust wiper 78, thus wiper 78 is instantaneously fixed in position where the output voltage produced on wiper 78 corresponds to a balance between the system output signal voltage and the modulated input signal voltage.

By closing switch 210 at the same time, the modulated input signal voltage which balances with the system output signal voltage is applied to amplifier 156. As a consequence, there is no immediate adjustment of wiper 166. Since the signal voltage developed at wiper 78 corresponds to this balanced condition the proportional and reset control actions are not operative to immediately change the value of the modulated input signal voltage that would produce an unbalance in actuator network 155 to cause motor 150 to be operative to automatically readjust the position of wiper 166.

Under the foregoing conditions it will be appreciated that in restoring the automatic control system 30 so as to automatically sustain the steam pressure condition arrived at through manual control of valves 14 and 18, there is no immediate adjustment in the positions of valves 14 and 18 when the transfer from manual to automatic control is made. Thus, smooth operation of boiler 10 is assured without the necessity of rebalancing the system 30 upon transfer from manual to automatic control.

It will be appreciated that by fixing wiper 78, the signal voltage developed at wiper 78 is also fixed and is transmitted to the controller network 96 along line 80 as the new set point signal voltage for the system which will sustain the steam pressure condition arrived at during manual control. This new set point signal voltage will act in the manner as hereinafter described to develop the proportional and reset control actions for maintaining the corresponding value of the steam pressure constant.

With the foregoing system, it will be appreciated that in restoring automatic control, the operator of the system has essentially three different alternatives available which provide for different set point values.

First, it may be desired to sustain the steam pressure condition arrived at during manual control and this is accomplished, as hereinbefore described, by opening switches 70, 219 and 222 and by closing switches 210, 216 and 218.

Alternatively, it may be desired to return to the original set point produced at wiper 39 so as to re-establish the steam pressure condition which prevailed before the system was disconnected for manual operation. It will be appreciated that restoration of the automatic control does not affect the set point setting of wiper 39 and that this set point signal voltage may again be impressed on the controller network 96 by closing switches 70, 210, 216 and 218 and by opening switches 219 and 222. Under these conditions, systems 30 will now under the supervision of the set point signal voltage developed at wiper 39 since motor 62 is now operative to adjust wiper 78 for transmitting to network 96 a stabilized set point signal voltage which is proportional to the voltage at wiper 39. Valves 14 and 18 now will automatically be controlled to produce a steam pressure corresponding to the original incoming set point signal voltage.

As a third alternative, it may be desirable to select an entirely new set point signal upon transfer from manual to automatic control. This is accomplished by setting wiper 40 to a proper position along resistor 36 and by respectively opening and closing switches 42 and 44. Thus, when switches 70, 210, 217 and 218 are closed and when switches 219 and 222 are opened the new set point signal voltage developed at wiper 40 will be impressed on the system and valves 14 and 18 will be positioned accordingly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a process control system having controller means for generating a control signal for continuously controlling the process, first and second control devices each producing an output signal governed by the deviation between a reference signal and an input signal, means for impressing the output of said first control device on said controller means to vary the control signal in a direction to reduce deviation between the reference signal and the input signal of said first control device, means for impressing the output of said second control device on said first control device to represent the reference signal of said first control device, a measuring element for producing a measured variable signal proportional to a transient condition of the process and for impressing said measured signal on said first control device to represent the input signal of said first control device, a signal source for producing a selectively fixed signal and for impressing said selectively fixed signal on said second control device to represent the reference signal of said second control device, means for feeding back said output signal of said second control device to represent the input signal of said second control device, and transfer means for selectively replacing the selectively fixed signal with said control signal and the feed-back output signal of said second control device with the output signal of said first control device to thereby alternately govern the output signal of said second control device either by the deviation between said selectively fixed signal and the fed-back output signal of said second control device or by the deviation between said set control signal and said output signal of said first control device.

2. The process control system as defined in claim 1, means for selectively disassociating the output signal of said first control device from said controller means, means for effectuating selective operation of said controller means upon disassociation of said first control device output signal from said controller means, said transfer means being arranged to effectuate the control of the output signal of said second control device by the deviation between said control signal and the output signal of said first control device during selective control of said controller means.

3. The process control system as defined in claim 1 wherein a further signal source is provided for producing a further selectively fixed signal and means for selectively replacing the first mentioned selectively fixed signal with said further selectively fixed signal.

4. The process control system as defined in claim 1, a condition responsive element for producing a condition-responsive signal proportional to a further transient condition of the process, and means for impressing the condition responsive signal on said first control device, said condition-responsive signal being acted on by the deviation between the reference signal and the input signal of said first control device to produce the output signal of said first control device.

5. The process control system as defined in claim 4, wherein said first control device is provided with means for modifying said condition-responsive signal with a signal proportional to departure of said measured variable signal from said reference signal.

6. The process control system as defined in claim 5 wherein said first control device is provided with means for further modifying said condition-responsive signal with a signal proportional to the time integral of the difference between the magnitude of said measured variable signal and said reference signal.

7. In a control system for optionally effectuating automatic or selective control of a variable process condition comprising means for providing an input signal that is a measure of the process condition being controlled, a first control device operative to generate a first output signal, a second control device having a second output signal that is responsive to the mesured difference between said first output signal and said input signal, a controller unit having an optionally selectively and automatically adjustable output signal adapted to control said condition, first means for rendering said adjustable output signal responsive to said second output signal and for rendering said first output signal responsive to the measured difference between said first output signal and a selectively fixed reference signal during automatic control of said condition, and second means effective during selective control of said condition to enable selective variation of said adjustable signal independently of said second output signal and to render said first output signal responsive to the measured difference between said second output signal and said adjustable output signal in place of the measured difference between said first output signal and said reference signal while maintaining said second output signal responsive to the measured difference between said first output signal and said input signal.

8. The control system defined in claim 7 wherein said first means comprises switch means actuatable to electrically disconnect said first control unit from response to said reference signal.

9. The control system defined in claim 7, comprising means providing a gradual restoration in the response of said first output signal to said reference signal upon change-over from selective control to automatic control of said adjustable output signal.

10. In a control system for optionally effectuating automatic or selective control of a variable process condition comprising first and second control devices each having an output signal channel and a pair of input signal channels and each including means for producing a control signal in said output signal channel which varies in accordance with the measured difference between signals fed into said input signal channels, first signal means for producing a signal that is a measure of the variable process condition to be controlled, means operatively connecting said first signal means to transmit the signal produced thereby to one of said input channels of said second control device, means operatively connecting the output channel of said first control device to the other of the input channels of said second control device to transmit the control signal produced by said first control device to said other input channel of said second control device thereby rendering the control signal of said second control device responsive to the measured difference between the control signal produced by said first control device and the signal produced by said first signal means, means including a signal responsive actuator operable to control said process condition, second signal means operable to produce a selectively controlled output signal independent of said control devices and said first signal means, third signal means for providing a fixed reference signal, first connection means effective during automatic control of said condition for operatively connecting said actuator to the output channel of said second control device to render said actuator responsive to the control signal of said second control device and further for operatively connecting said third signal means and the output channel of said first control device to respective ones of the input channels of said first control device for rendering the control signal of said first control device responsive to the measured difference between the first control device control signal and said fixed reference signal, and second connection means effective during selective control of said condition for operatively connecting said second signal means to said actuator to render said actuator responsive to said selectively controlled signal in place of the control signal produced by said second control device and further for operatively connecting said second signal means and the output channel of second control device to respective ones of said input channels of said first control device to render the control signal of said first control device responsive to the measured difference between said selectively controlled signal and the control signal of said second control device in place of said fixed reference signal and said control signal of said first control device.

11. In a control system for optionally effectuating automatic or selective control of a variable process condition, a set point control device having an output signal channel and a pair of input signal channels and being operative to produce a control device having an output signal channel and a pair of input signal channels and being operative to produce a control signal in said output signal channel that varies in accordance with the measured difference between signals fed into said input signal channels, a first signal source for producing an input signal that is a measure of the condition to be controlled, means operatively connected to said output channel and said first signal source for controlling said condition in accordance with the measured difference between said control signal and the signal produced by said first signal means; means effective during automatic control of said condition for feeding a fixed reference signal and said control signal to respective ones of said input signal channels to render said control signal responsive to the measured difference between itself and said fixed reference signal, a second signal source for producing a selectively controllable signal independent of the other of said signals, means for optionally controlling said condition with said selectively controllable signal in place of the measured difference between said input signal and said control signal, and means effective during selective control of said condition by said selectively controllable signal for feeding said selectively controllable signal and a further signal representing the measured difference between said control signal and said input signal to respective ones of said input signal channels in place of said fixed reference signal and said control signal to thereby render said control signal responsive to the measured difference between said further signal and said selectively controllable signal during selective control of said condition.

12. The control system defined in claim 7 comprising means optionally alternatively rendering said system subject to said fixed reference signal or to the set point input reached during selective control of said adjustable output signal upon changeover from selective control to automatic control of said output signal.

References Cited by the Examiner

UNITED STATES PATENTS

| | | | |
|---|---|---|---|
| 2,589,834 | 3/52 | MacCallum | 318—489 |
| 2,644,642 | 7/53 | Smoot | 236—26 |
| 2,679,022 | 5/54 | McIlhenny | 318—28 |
| 2,714,894 | 8/55 | Jewett | 251—26 X |
| 2,734,155 | 2/56 | Schieck | 318—489 |
| 2,740,082 | 3/56 | Sedgfield | 318—28 |
| 2,830,244 | 4/58 | Davis | 318—28 |
| 2,833,970 | 5/58 | Cummings | 318—28 |
| 2,851,047 | 9/58 | Eller | 251—26 X |
| 2,949,273 | 8/60 | Roper et al. | 251—26 |

OTHER REFERENCES

Ryder, John D.: Engineering Electronics, McGraw-Hill, New York, 1957, page 628.

JOHN F. COUCH, *Primary Examiner.*

PERCY L. PATRICK, ORIS L. RADER, *Examiners.*

UNITED STATES PATENT OFFICE
CERTIFICATE OF CORRECTION

Patent No. 3,214,660                                        October 26, 1965

Charles H. Smoot

It is hereby certified that error appears in the above numbered patent requiring correction and that the said Letters Patent should read as corrected below.

Column 3, line 35, for "When" read -- Where --; column 4, line 23, for "comprising" read -- comparing --; column 10, line 47, for "transformerg" read -- transformer --; column 16, lines 42 to 44, strike out "device having an output signal channel and a pair of input signal channels and being operative to produce a control".

Signed and sealed this 2nd day of August 1966.

(SEAL)
Attest:

ERNEST W. SWIDER                                        EDWARD J. BRENNER
Attesting Officer                                              Commissioner of Patents